United States Patent
Lin

(10) Patent No.: US 10,795,857 B2
(45) Date of Patent: Oct. 6, 2020

(54) BLOCKCHAIN SYSTEM AND METHOD THEREOF

(71) Applicant: INDUSTRIAL TECHNOLOGY RESEARCH INSTITUTE, Hsinchu (TW)

(72) Inventor: Chia-Hui Lin, Taoyuan (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 251 days.

(21) Appl. No.: 16/135,739

(22) Filed: Sep. 19, 2018

(65) Prior Publication Data

US 2019/0251187 A1    Aug. 15, 2019

(30) Foreign Application Priority Data

Feb. 14, 2018 (TW) .............................. 107105498 A

(51) Int. Cl.
| | |
|---|---|
| *G06F 12/00* | (2006.01) |
| *G06F 16/00* | (2019.01) |
| *G06F 16/16* | (2019.01) |
| *H04L 9/06* | (2006.01) |
| *G06F 16/27* | (2019.01) |

(Continued)

(52) U.S. Cl.
CPC .......... *G06F 16/16* (2019.01); *G06F 16/1734* (2019.01); *G06F 16/1834* (2019.01); *G06F 16/27* (2019.01); *H04L 9/0643* (2013.01); *H04L 2209/38* (2013.01)

(58) Field of Classification Search
None
See application file for complete search history.

(56) References Cited

U.S. PATENT DOCUMENTS

| | | |
|---|---|---|
| 2015/0294308 A1 | 10/2015 | Pauker |
| 2016/0028552 A1 | 1/2016 | Spanos |

(Continued)

FOREIGN PATENT DOCUMENTS

| | | |
|---|---|---|
| CN | 105488675 A | 4/2016 |
| CN | 106528775 A | 3/2017 |

(Continued)

OTHER PUBLICATIONS

Sompolinsky et al., "Accelerating Bitcoin's Transaction Processing Fast Money Grows on Trees, Not Chains", pp. 1-31.
Li et al., "Towards Scalable and Private Industrial Blockchains", 2017, pp. 9-14.
Luu et al., "A Secure Sharding Protocol for Open Blockchains", 2016, pp. 17-30.
Eyal et al., "Bitcoin-NG: A Scalable Blockchain Protocol", Usenix Association, 2016, 16 pages.

(Continued)

*Primary Examiner* — Tuan A Pham
(74) *Attorney, Agent, or Firm* — Muncy, Geissler, Olds & Lowe, P.C.

(57) ABSTRACT

A method includes the steps of: monitoring status information of a blockchain system; determining whether the status information meets a blockchain branch condition; when the status information matches the blockchain branch condition, writing a branch instruction to a selected block of the blockchain, wherein the branch instruction is configured to enable the blockchain to form a plurality of branches, and divide a plurality of blockchain devices in the blockchain system into a plurality of groups to verify the branches in parallel; and obtaining a maximum transmission delay time in the group, and deciding a new one to generate blocks of the first branch according to the maximum transmission delay time.

18 Claims, 5 Drawing Sheets

(51) Int. Cl.
*G06F 16/17* (2019.01)
*G06F 16/182* (2019.01)

(56) References Cited

U.S. PATENT DOCUMENTS

| | | | |
|---|---|---|---|
| 2016/0098723 A1 | 4/2016 | Feeney | |
| 2017/0033932 A1 | 2/2017 | Truu | |
| 2017/0041148 A1 | 2/2017 | Pearce | |
| 2017/0046651 A1* | 2/2017 | Lin | G06Q 20/367 |
| 2017/0132619 A1 | 5/2017 | Miller | |
| 2017/0132621 A1 | 5/2017 | Miller | |
| 2018/0293583 A1* | 10/2018 | Rhie | G06Q 20/02 |
| 2018/0294955 A1* | 10/2018 | Rhie | H04L 9/0637 |
| 2018/0316716 A1* | 11/2018 | Kozloski | A63F 13/79 |
| 2019/0213281 A1* | 7/2019 | Anders | G06F 16/24575 |
| 2019/0238525 A1* | 8/2019 | Padmanabhan | H04L 9/3236 |
| 2019/0295049 A1* | 9/2019 | Karame | H04L 9/30 |
| 2019/0391979 A1* | 12/2019 | Bistram | G06F 16/27 |
| 2019/0394267 A1* | 12/2019 | Bistram | H04L 67/108 |

FOREIGN PATENT DOCUMENTS

| | | |
|---|---|---|
| CN | 107481146 A | 12/2017 |
| CN | 107666388 A | 2/2018 |
| CN | 107679863 A | 2/2018 |
| TW | 200837562 A1 | 9/2008 |
| TW | M543413 U | 6/2017 |

OTHER PUBLICATIONS

Kogias et al., "Enhancing Bitcoin Security and Performance with Strong Consistency via Collective Signing", Usenix Association, 2016, 19 pages.

Gencer et al., "Service-Oriented Sharding with Aspen", 9 pages.

Castro et al., "Practical Byzantine Fault Tolerance", Proceedings of the Third Symposium on Operating Systems Design and Implementation, 1999, 2 pages, https://www.usenix.org/legacy/events/osdi99/full_papers/castro/castro_html/castro.html.

Kotla et al., "Zyzzyva: Speculative Byzantine Fault Tolerance", ACM Transactions on Computer Systems, Article 7, 2009, pp. 1-39, vol. 27, No. 4.

King et al., "PPCoin: Peer-to-Peer Crypto-Currency with Proof-of-Stake", 2012, 6 pages.

"Scalability", Bitcoin Wiki, 5 pages, https://en.bitcoin.it/wiki/Scalability.

"Stress Test Prepares VisaNet for the Most Wonderful Time of the Year", Visa Viewpoints, 2013, 5 pages, https://www.visa.com/blogarchives/us/2013/10/10/stress-test-prepares-visanet-for-the-most-wonderful-time-of-the-year/index.html.

"On Sharding blockchains", wiki, 18 pages, https://github.com/ethereum/wiki/Sharding-FAQ.

"Architecture Explained", http://hyperledger-fabric.readthedocs.io/en/latest/arch-deep-dive.html, 16 pages.

Proof of Stake, Bitcoin Wiki, 10 pages, https://en.bitcoin.it/wiki/Proof_of_Stake#How_Proof_of_Stake_Addresses_Monolpoly_Problems,%20last%20accessed%20on%2011/16/2016.

* cited by examiner

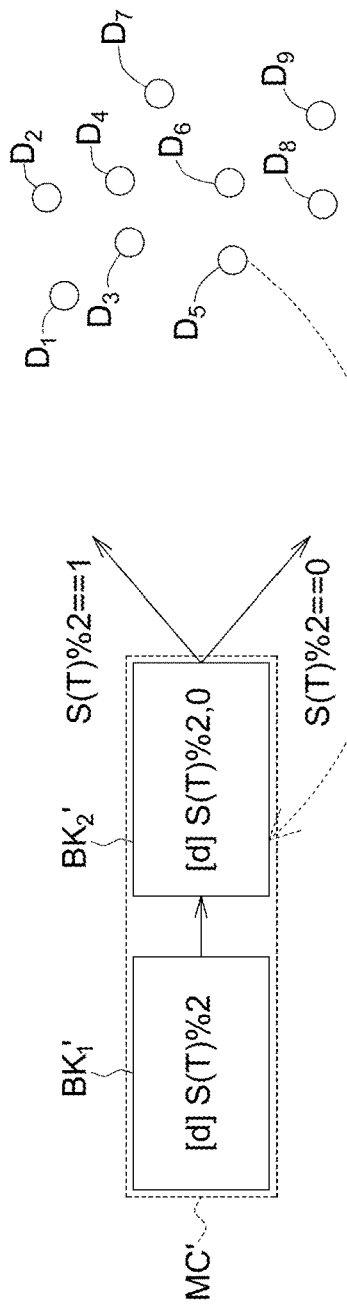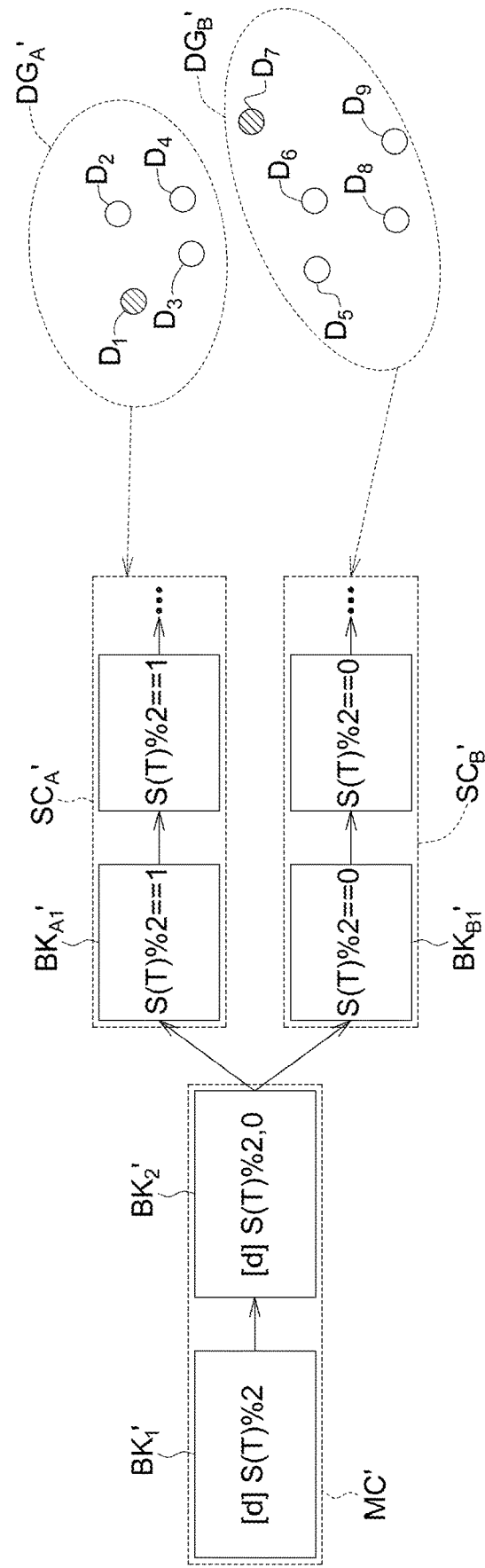
FIG. 3A
FIG. 3B

BLOCKCHAIN SYSTEM AND METHOD THEREOF

This application claims the benefit of Taiwan application Serial No. 107105498, filed Feb. 14, 2018, the subject matter of which is incorporated herein by reference.

TECHNICAL FIELD

The present disclosure relates to a blockchain system and a method thereof.

BACKGROUND

The blockchain is originated from Bitcoin, which was proposed in 2008, through which the blockchain can solve the problem of trust in transaction(s). The blockchain system is a distribution system. The "blockchain" is named according to the "block", formed by packing multiple transactions and the hash value of the previous block, and the "link" generated with respect to the dependencies of the hash values within the previous block and the following block. Due to the characteristics of the hash value, once the contents of the previous block have been tampered with, the contents of the following blocks will be completely different, thereby protecting the content of the "transaction" from being tampered. A "block" is able to be analogical to a set of data in the computer, which is stored in a pre-set field and format, and each block can record a lot of transaction content. A blockchain node refers to a blockchain node program or a blockchain node program that includes a ledger program installed on a server. The blockchain nodes exchange data with each other via a peer-to-peer network. The user installs the client application of the application program to perform application services, such as payment and receipt. The application program transmits the transaction content back to the blockchain node, and the blockchain node then notifies the transaction content to all the blockchain nodes in the system to synchronize the ledger. In addition, for example, the verifiable anonymity is used to confirm the truth of the transaction, and the user cannot deny it. In recent years, the decentralization of blockchain technology and its inability to be tampered with are used to solve trust issues among people. For example, financial transactions, business cooperation, and many other applications are expected to improve the security of existing trading mechanisms through the blockchain technology. I. Unfortunately, the blockchain is currently experiencing performance bottlenecks, which leads to many application limitations. For example, VISA financial transactions process an average of 2,000 transactions per second, up to a maximum of 56,000 transactions per second. However, bitcoin using blockchain technology can only handle about 7 transactions per second, while Ethereum can only handle about 15 transactions per second. Therefore, it is obviously unable to meet the usage requirements.

Therefore, how to accelerate the transaction verification speed of blockchain technology is one of the topics currently to be solved.

SUMMARY

The present disclosure is to provide a blockchain system and a method thereof. According to one embodiment of the present disclosure, the blockchain device is able to send a branch instruction when a status information of the blockchain system complies with a blockchain branch condition, such that the blockchain generates plural of branches. According to the branch instruction, the plural of blockchain devices in the network are divided into plural of groups for verifying these branches in parallel. Since the blockchain devices in the same group have the shorter transmission delay between each other, the time interval of block generation of one branch is less than that of the whole consensus network. Thus, it is able to shorten the time interval of block generation of each branch to increase the amount of transactions processed in the same time. Moreover, when the blockchain device finds that the number of the blockchain devices for verifying one branch is too less, the computing power is too small, or other conditions that root the blockchain emergency conditions, the blockchain device is also able to send a mergence instruction to merge some specific branches, whereby the security and the stability of the blockchain are ensured.

According to one embodiment of the present disclosure, a method implemented in a blockchain system is provided. The blockchain system includes a plurality of blockchain devices that participate in a verification of a blockchain to generate a plurality of blocks in the blockchain. The method includes: monitoring a status information of the blockchain system by a first blockchain device of the blockchain devices; determining whether the status information complies with a blockchain branch condition by the first blockchain device; when the first blockchain device determines that the status information complies with the blockchain branch condition, the first blockchain device writes a branch instruction to a selected block in the blockchain, wherein the branch instruction is configured for enabling the blockchain to form a plurality of branches, and the blockchain devices are divided into a plurality of groups in response to the branch instruction for verifying the branches in parallel, wherein the first blockchain device joins a first group of the groups, and the first group is responsible for verifying a first branch of the branches; and obtaining an in-group maximum transmission delay time of the first group by the first blockchain device, and determining a time interval of generation of new block to generate a plurality of blocks in the first branch according to the in-group maximum transmission delay time.

According to one embodiment of the present disclosure, a blockchain system is provided. The blockchain device includes a plurality of blockchain devices participating in a verification of a blockchain to generate a plurality of blocks in the blockchain, wherein the blockchain devices includes a first blockchain device, the first blockchain device is configured for executing the following steps: monitoring a status information of the blockchain system; determining whether the status information complies with a blockchain branch condition; when the status information complies with the blockchain branch condition, writing a branch instruction to a selected block in the blockchain, wherein the branch instruction is configured for enabling the blockchain to form a plurality of branches, and the blockchain devices are divided into a plurality of groups in response to the branch instruction for verifying the branches in parallel, wherein the first blockchain device joins a first group of the groups, and the first group is responsible for verifying a first branch of the branches; and obtaining an in-group maximum transmission delay time of the first group, and determining a time interval of generation of new block to generate a plurality of blocks in the first branch according to the in-group maximum transmission delay time.

BRIEF DESCRIPTION OF THE DRAWINGS

The present disclosure can be more fully understood by reading the following detailed description of the embodiment, with reference made to the accompanying drawings as follows:

FIG. 3A is a schematic diagram of the process of branching the blockchain in the first stage;

FIG. 3B is a schematic diagram of the process of branching the blockchain in the second stage;

DETAILED DESCRIPTION OF DISCLOSED EMBODIMENTS

Figure 1A:
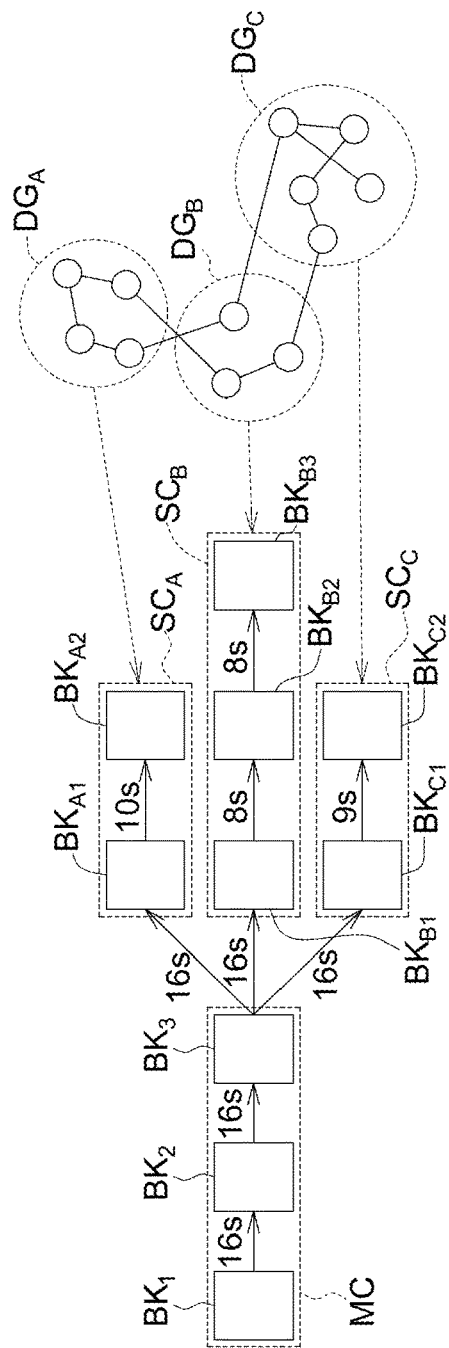
FIG. 1A is a schematic diagram of branching a blockchain according to an embodiment of the present disclosure.

The present disclosure is to provide a blockchain system and a method thereof. In one embodiment, the blockchain system is a distribution system, and the blockchain nodes (referred as "blockchain device" in the present disclosure), which participate in verifying the blockchain, are connected via a peer-to-peer (P2P) network. Each of the blockchain devices that maintain the blockchain has a local database for the device itself to manage and certify the data it holds, and observes a set of consensus mechanism together. The pre-established consensus mechanism selects one blockchain device and allows it to write the block, broadcasts the block to all of the blockchain devices in the network via the P2P network, and then each of the blockchain devices updates its own local database. In this way, all of the blockchain devices in the P2P network are able to verify and maintain the blockchain in the blockchain network together.

Due to the special data structure of the blockchain, it has the characteristic that the transaction record is unable to be modified. The data to be recorded in the blockchain is described as a "transaction". Plural of transactions are organized into the blocks, and each of the blocks includes a hash value of the linked previous block content. Therefore, if the interested person wants to modify the data of the block, he must modify all the blocks behind this block, otherwise the hash values fail to correspond to each other. In other words, under the architecture of the blockchain, although different blockchain devices do not trust each other and the malicious blockchain device may arbitrarily tamper with its data and attempt to synchronize with other blockchain devices, other blockchain devices still can make the determination according to the hash values to ensure the correctness of the data.

On the other hand, since the blockchain system is a decentralized distribution system, there is no master-slave relationship among each of the blockchain devices in the system. Therefore, a consensus mechanism is required to allow one blockchain device to accept the data of the other blockchain devices, and its local database can operate normally. Currently, there are several consensus mechanisms implemented in the blockchain, such as, the Proof-of-Work (PoW) consensus mechanism (based on the computing power), the Proof-of-Stack (PoS) mechanism, the Practical Byzantine Fault Tolerance (PBFT) consensus mechanism, the Speculative Byzantine Fault Tolerance (SBFT) consensus mechanism, and so on.

The so-called "computing power" is defined, for example, as the number of the functions solved per second. For example, in the PoW consensus mechanism, the computing power may be, e.g., the number of hash functions solved by the blockchain device per second as the unit (Hash/s). In other applications, the computing power may also be presented by other indicators that show the ability of the blockchain device for solving the problem. In general, greater computing power means that the blockchain device solves the problem faster, and the blockchain device has higher probability to solve the problem and obtain the allowance for writing the block.

According to the PoW consensus mechanism, all blockchain devices compete in computing the difficult problem. The blockchain device which first solves the problem is allowed to distribute a new block. The concept of the PoS consensus mechanism is similar to equity. In other words, the blockchain device having more blockchain virtual currencies is the same as having more equity of the blockchain, thus it is easier for this device to obtain the allowance for distributing the new block. In some cases, in order to prevent the allowance for distributing the new block in the blockchain from being centralized in one certain blockchain device, part of the PoS consensus mechanism may determine the probability of obtaining the allowance for distributing the block according to "the number of held currency multiplied by the coin-age", wherein the coin-age means the time period from the last time the allowance for distributing the block is obtained to the presence. Therefore, when a blockchain device does not obtain the allowance for distributing the block for a long time, the probability of the blockchain device obtaining the allowance for distributing a new block will increase with time. In addition, according to the PBFT consensus mechanism and the SBFT consensus mechanism, the blockchain device can obtain the allowance for distributing the block by specific rules in turn, but the content of the distributed block must be provided to other blockchain devices to verify. If the distributed block content is determined as true after the verification, other blockchain devices will attach an endorsement to the block, and the blockchain device can prove that the content of the block distributed by itself is true through the agreed number of the endorsements. The purpose of the consensus mechanism design is to avoid a blockchain device continuously obtaining the allowance for writing the block. If a malicious device continuously obtains the allowance for writing the block and writes the malicious data and generates a long chain, such as a 51% attack, other blockchain devices will believe the malicious block data.

In order to increase the performance of the blockchain system, depending on the system requirements or the consensus algorithm adopted, there are currently two ways to speed up the generation of the block in the blockchain: one is to directly reduce the difficulty of the problem that the blockchain device solves; another is to increase the capacity of each block. However, these methods are limited by the transmission delay time of the network. For example, it is supposed that each of two blockchain devices (e.g., the device A and the device B) generate a block at a frequency of one block per second (i.e., the time interval of generation of block is 1 second), and the devices A and B are separated by a certain distance and a transmission delay time of about 2.5 seconds. When the block generated by the device A is transmitted to the device B, the device B has already generated two blocks by itself. Therefore, the device B will not recognize the block transmitted from the device A. In this case, the devices A and B will not be able to reach consensus. Similarly, if the capacity of the blocks generated by the devices A and B becomes larger, the network transmission delay will be relatively longer. When the block generated by the device A is transmitted to the device B, the device B has already created multiple blocks by itself. Therefore, the devices A and B also fail to reach consensus. In other words, in order to ensure consensus among the blockchain devices, the time interval of generation of the block must be longer than the transmission delay time between the blockchain devices.

According to one embodiment of the present disclosure, when a status information of the blockchain system complies with a blockchain branch condition, the blockchain device may send a branch instruction so that the blockchain generates multiple branches. Multiple blockchain devices in the network are divided into multiple groups in response to the branch instruction for verifying the branches in parallel. Since the transmission delay time between the blockchain devices in the same group is shorter, the time interval of generating block of one branch is shorter than the time interval of generating block of the consensus entire network. Therefore, the time interval of the block for each branch can be shortened, so as to increase the amount of transactions processed in the same time. In addition, when the blockchain device finds out that the number of the blockchain devices for verifying one branch is too less, the computing power is too small, or other conditions that complies with the blockchain mergence condition, the blockchain device may also send a mergence instruction to merge specific branches, whereby the security and stability of the blockchain is ensured.

The blockchain device described herein is, for example, an electronic device including a memory and a processor. The memory can store programs, instructions, data or files that can be obtained or executed by the processor. The processor is coupled to a memory and is configured for performing the method of the embodiments of the present disclosure. The processor may be implemented, for example, as a micro controller, a microprocessor, a digital signal processor, an application specific integrated circuit (ASIC), a digital logic circuit, or a field programmable gate array (FPGA), or other hardware component with an arithmetic processing function. Multiple blockchain devices that are communicatively connected to each other can form a blockchain system and participate in a verification of a blockchain. In addition, the method provided by the present disclosure can also be implemented as a software program, and the software program can be stored in a non-transitory computer readable storage medium such as a hard disk, a compact disk, and a portable disk, memory, etc., when the processor loads the software program from a non-transitory computer-readable storage medium, the method of the present disclosure is able to be performed.

Figure 1B:
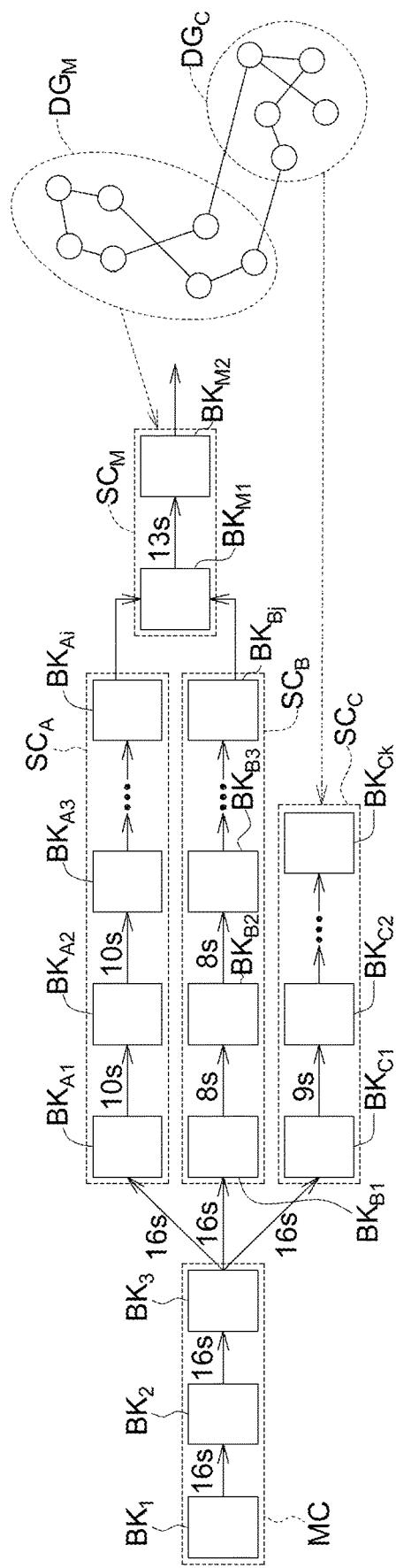
FIG. 1B is a schematic diagram of merging a blockchain according to an embodiment of the present disclosure.

In the following, at first, the two types of "branch" and "mergence" of the blockchain will be described according to the embodiments of FIG. 1A and FIG. 1B. It should be noted that FIG. 1A and FIG. 1B are merely used to illustrate possible embodiments of the present disclosure and thus the present disclosure is not limited thereto. The number of the blocks, the branch method, the mergence method, and the time interval of generation of the block shown in FIG. 1A and FIG. 1B should not be considered as restrictive.

FIG. 1A is a schematic diagram of a blockchain branch according to one embodiment of the present disclosure. In the embodiment of FIG. 1A, the blockchain system includes a plurality of blockchain devices (i.e., the blockchain nodes, represented by empty circles) which jointly maintain the blockchain structure as shown on the left in the figure. Plural of blockchain devices are communicatively coupled to each other to form a network, such as a P2P network.

The blockchain structure includes a blockchain MC and three branches $SC_A$, $SC_B$, and $SC_C$ derived from the blockchain MC, in which the blockchain MC includes a plurality of blocks $BK_1$-$BK_3$, and the branch $SC_A$ includes the blocks $BK_{A1}$ and $BK_{A2}$. The branch $SC_B$ includes the blocks $BK_{B1}$, $BK_{B2}$, and $BK_{B3}$, and the branch $SC_C$ includes the blocks $BK_{C1}$ and $BK_{C2}$.

In the present description, the first block in one blockchain branch is called as a "root block". Taking FIG. 1 as an example, the root blocks of branches $SC_A$, $SC_B$, and $SC_C$ are the block $BK_{A1}$, the block $BK_{B1}$, and the block $BK_{C1}$, respectively.

Before the blockchain MC not yet form the branches $SC_A$, $SC_B$, $SC_C$, the blockchain MC is verified and maintained by all blockchain devices together, and extended at the frequency of one block generated per 16 seconds (i.e., the time interval of generation of the block is 16 seconds). The time interval of generating block of the blockchain MC can be adjusted according to the consensus difficulty parameter of the blockchain system. In one embodiment, the consensus difficulty parameter may refer to the number of preceding "0" in the calculated hash value. For example, when the block $BK_3$ is calculated, it is able to use the hash value of the previous block $BK_2$, the transaction hash value of the newly added block $BK_3$, and a random number (Nonce) to perform the hash function/hash algorithm to obtain new hash value. If the number of preceding "0" in the obtained new hash values is equal to the consensus difficulty parameter, then this block is a block that is verified as valid. For further example, if the current blockchain system verifies the n block and H( ) represents a hash value, then $H_n=H(H_{n-1}+H(\Sigma TX_n)+Nonce)$, in which $H(\Sigma TX_n)$ represents the hash value of the transaction of the newly added n block. It is supposed that the consensus difficulty parameter is 4. If the calculated $H_n$ is 0000c3af42 . . . dcd4e9, then it complies with the condition that the number of the preceding "0" is 4. Therefore, $H_n$ is verified as valid. On the contrary, if $H_n$ is 1312af178c . . . 34c64, $H_n$ is verified as invalid because $H_n$ does not root the condition that the consensus difficulty parameter is 4. The blockchain device needs to change the Nonce value and recalculate the hash value. Therefore, by adjusting the consensus difficulty parameter, the time interval of generation of the block can be maintained within a certain interval. For example, it is supposed that the blockchain system sets the time interval of generating block of the blockchain MC as 16 seconds. If the system detects that the time interval of generating block is less than 16 seconds, the consensus difficulty parameter is incremented by 1; on the contrary condition, the consensus difficulty parameter is subtracted by 1, and so on.

During the verification of the blockchain MC, all blockchain devices (or one or more specific blockchain devices in the system) will detect status information of the blockchain system. If any blockchain device (or a pre-designated specific blockchain device) finds that a status information of the blockchain system complies with a blockchain branch condition, the blockchain device will write a branch instruction to the block (e.g., the block $BK_3$) to require the blockchain MC to generate the branches. If the branch instruction is also approved by other blockchain devices in the system, the blockchain MC will form multiple branches, such as the branches $SC_A$, $SC_B$, and $SC_C$, and the blockchain devices in the system will also be divided into multiple corresponding groups, such as the groups $DG_A$, $DG_B$, and $DG_C$, for verifying the branches $SC_A$, $SC_B$, and $SC_C$, respectively, in which all the time interval of generation of block of the branches $SC_A$, $SC_B$, and $SC_C$ are less than the time interval of generation of block of the blockchain MC (16 seconds). As shown in FIG. 1A, the he time interval of generation of block of the branches $SC_A$, $SC_B$, and $SC_C$ are 10 seconds, 8 seconds, and 9 seconds, respectively. In some embodiments, the blockchain device can determine whether a branch instruction is approved according to the existing consensus mechanism. For example, according to the PBFT and SBFT consensus mechanisms, the branch instruction sent by the blockchain device will be provided to other blockchain devices for verification. If the branch instruction is verified as true, it represents that the branch instruction is approved by other blockchain devices.

FIG. 1B is a schematic diagram of blockchain mergence according to one embodiment of the present disclosure. As shown in FIG. 1B, after the blockchain is branched for a period, the branch $SC_A$ extends i blocks to the block $BK_{Ai}$, the branch $SC_B$ extends j blocks to the block $BK_{Bj}$, and the branch $SC_C$ extends k blocks to the block $BK_{Ck}$.

The branch $SC_A$ and the branch $SC_B$ can respond to the mergence instruction sent by the blockchain device in the system and be merged into a new branch $SC_M$. Correspondingly, the group $DG_A$ and the group $DG_B$ will also be merged into a new group $DG_M$ to jointly verify and maintain the new branch $SC_M$.

The blockchain device in the new group $DG_A$ also adjusts the time interval of block generation in the new branch $SC_M$ (such as the block $BK_{M1}$ and block $BK_{M2}$), for example, to generate one block per 13 seconds. This time interval of block generation may be longer than the time interval of block generation of each branch before the mergence. This is because the new group $DG_M$ contains more blockchain devices, resulting that a possible maximum transmission delay time among the blockchain devices becomes longer. On the other hand, because of the branch-mergence relationship, the blocks $BK_{M1}$ and $BK_{M2}$ will inherit the hash value of the blocks in the branches $SC_A$ and the $SC_B$.

Figure 2:
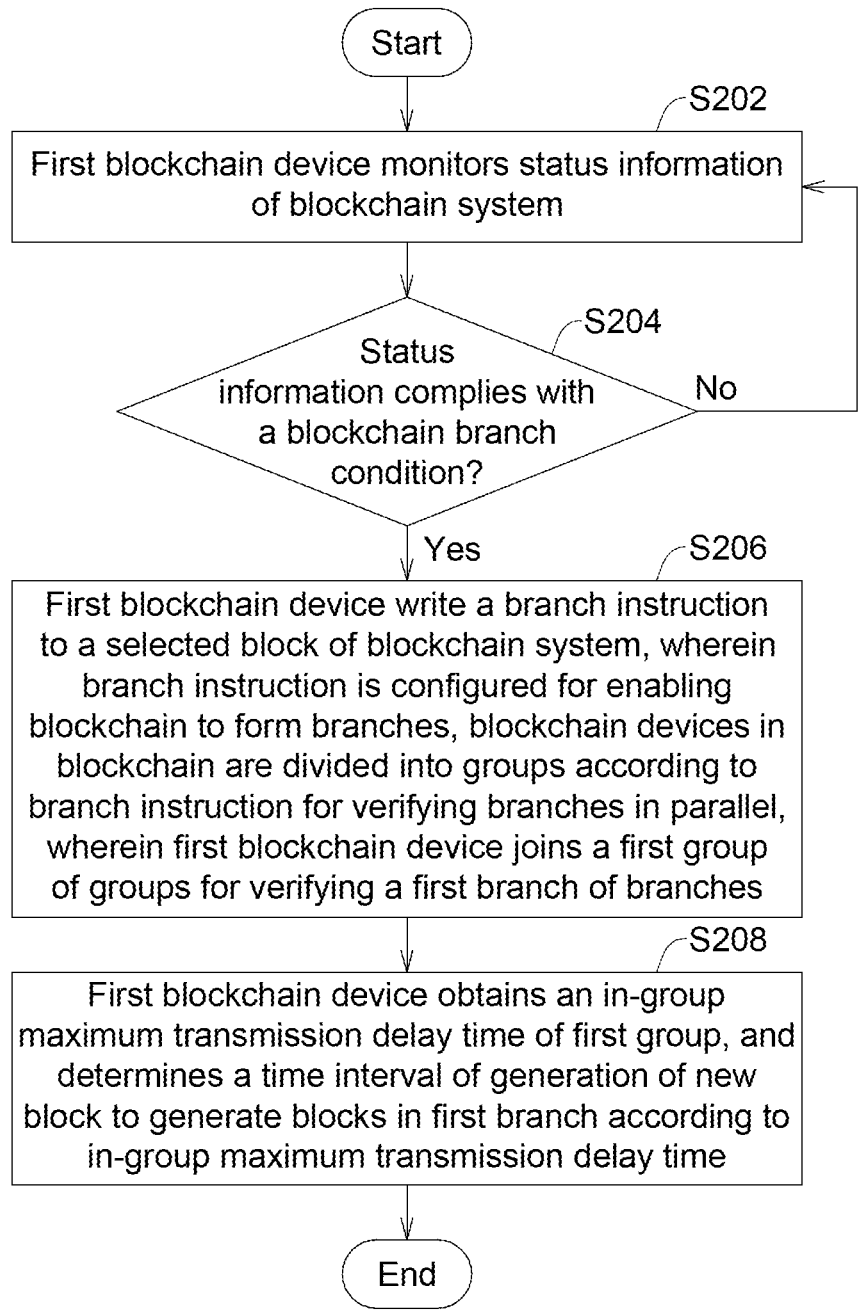
FIG. 2 is a flow chart of a method for the condition of branching the blockchain according to an embodiment of the present disclosure.

FIG. 2 is a flowchart of a method according to an embodiment of the present disclosure. This flow is for the case of blockchain branch. The described method can be implemented in a blockchain system. The blockchain system includes a plurality of blockchain devices. The blockchain devices are communicatively connected to each other to form a network and participate in a verification of a blockchain to generate a plurality of blocks in the blockchain.

In step S202, a first blockchain device in the blockchain devices monitors a status information of the blockchain system. The status information may be, for example, the computing power of the main chain or the branch of the block, the number of blockchain devices responsible for verifying the main chain or the branch of the block, and so on.

In step S204, the first blockchain device determines whether the status information complies with a blockchain branch condition. In one embodiment, the blockchain branch conditions may have different definition according to the adopted consensus algorithm. For example, the blockchain branch conditions may include at least one of the following conditions (1) and conditions (2), wherein the condition (1) is: Verify the computing power of verifying the blockchain or one of the multiple branches of the blockchain is greater than a first computing power threshold value, and the amount of transactions to be processed is greater than a first transaction amount threshold value, and the condition (2) is: the number of the blockchain devices for verifying the blockchain or one of the multiple branches of the blockchain is greater than a first device number threshold value, and the amount of transactions to be processed is greater than a second transaction amount threshold value. The first computing power threshold value, the first transaction amount threshold value, the first device number threshold value, and the second transaction amount threshold value mentioned herein may be arbitrary, depending on system requirements or the adopted consensus algorithm.

If step S204 is determined as yes, in step S206, the first blockchain device will write a branch instruction to a selected block in the blockchain. The branch instruction is configured for enabling the blockchain to form multiple branches. The blockchain devices in the blockchain system can be divided into multiple groups in response to the branch instruction for verifying the branches in parallel. The first blockchain device joins a first group of the groups, and the first group is responsible for verifying a first branch of the branches.

Further, after the branch instruction is written into the block, all blockchain devices in the blockchain system will receive a copy of the branch instruction and execute the verification for the branch instruction, for example, to verify whether the status information of the current system is really complies with the blockchain branch condition. If the verification is passed, then the approval is obtained. All blockchain devices in the system will be divided into multiple groups, and each group is responsible for verifying a corresponding branch. In one embodiment, it allows the blockchain devices having shorter transmission delay times to be added to the same group to accelerate the time interval of generation of block of the branches.

In one embodiment, the blockchain system may build a classification function in each block when generating a block. When the branch of the blockchain is to be formed, a plurality of classification results generated by substituting a classification condition into the classification function can be used as an index value of each branch. In other words, each block in the blockchain includes a classification function, and the plural of classification function values possibly obtained by substituting the classification condition into the classification function are corresponding to the branches, respectively. The classification condition may be a transaction sender identification (sender ID), a smart contract type, a smart contract content, or a transaction attribute parameter. For example, if the classification condition is a transaction sender ID and the classification function is to calculate a remainder result of the transaction sender ID divided by a value. If the value is 2, all possible obtained classification function values are two kinds of classification results including the remainder=1 and the remainder=0, in which the result of the remainder=1 can be used to indicate a branch, and the result of the remainder=0 can be used to indicate another branch. Through the above classification mechanism, the same branch can be used to process related transaction data. In other words, different branches will correspond to different types of transactions. As in the foregoing example, since the transactions of the same transaction sender may be related to each other, the transaction sender ID can be used as the classification conditions for the branch.

If step S204 is determined as no, the flow returns to step S202, and the first blockchain device continues to monitor the status information of the blockchain system.

In step S208, the first blockchain device obtains an in-group maximum transmission delay time of the first group, and determines a time interval of generation of new block to generate the block in the first branch according to the in-group maximum transmission delay time.

The in-group maximum transmission delay time of the first group refers to the maximum transmission time required to propagate a block to all the blockchain devices in the first group. In general, since the number of blockchain devices in the first group is less than the number of all blockchain devices in the blockchain system, the in-group maximum transmission delay time is generally shorter than the maximum transmission delay time of the system. After the in-group maximum transmission delay time is determined, the first blockchain device may coordinate with other blockchain devices in the first group about the time interval of generation of new block. This time interval of generation of new block may be several times of the in-group maximum transmission delay time, so as to avoid the problem that no consensus is available among the blockchain devices. In addition, because the in-group maximum transmission delay time is usually shorter than the maximum transmission delay time of the system, the time interval of new block generation is also shorter than the time interval of block generation before the branch. In other words, after the blockchain is branched, the time interval of generation of the branch block will be shortened, and the blockchain device in the group may generate the corresponding branch block based on the faster frequency, thereby enhancing the system performance. The detailed derivation of this section will be described in the following paragraphs.

The time interval of block generation can be implemented according to different consensus algorithms. For example, in a blockchain system implemented by PBFT and SBFT, the blockchain device will distribute a block after obtaining a certain number of endorsements, so the time interval of block generation can be precisely controlled in this manner. For example, if a blockchain device wants to initiate a transaction, the blockchain device will broadcast the transaction to other blockchain devices in the network for verifying the correctness of the transaction. If the transaction is determined to be true after the verification by other blockchain devices, that is, the approvals of other blockchain devices are obtained, the other blockchain devices will give the transaction an endorsement. After the blockchain device that initiates the transaction collects a certain number of the endorsements, it can write the transaction into the blockchain. In a consensus blockchain system implemented by PoW, because the time interval of generation of block is determined according to the time for solving the problem, the system can adjust the consensus difficulty parameter to adjust the time interval of block generation of the main chain or the branch of the block. In addition, the blockchain system can also adjust the time interval of block generation of the main chain or the branches of the block by changing the capacity of the blocks.

In one embodiment, the first blockchain device may measure individual transmission delay times between itself and other blockchain devices in the network, and store a correspondence table, in which the correspondence table records the transmission delay times and the group(s)/corresponding branch(es) to which the other blockchain devices in the blockchain system belong. The first blockchain device can further broadcast the measured transmission delay times to other blockchain devices in the blockchain system, so that the blockchain devices in the system know the transmission delay time between each other. In this manner, the blockchain devices in the first group can communicate to obtain the in-group maximum transmission delay time of the first group, and accordingly determine the time interval of block generation of the first branch. For example, the time interval of block generation is set to Q times the in-group maximum transmission delay time of the first group, in which Q is a real number greater than 1.

In addition, as described above, since the number of blockchain devices in the first group is less than the number of blockchain devices in the blockchain system and the transmission delay time among the blockchain devices is short, the time interval of block generation of the first branch blocks may also be set to be shorter than the time interval of block generation of the block chain before the branch. The specific derivation is provided below:

Assuming that each block in the traditional blockchain (for example, a blockchain with only a single main chain) processes K transactions on average, the performance of the traditional blockchain is:

1/TK (transaction/unit time (seconds));

in which T is the time interval of block generation of the traditional blockchain.

In the same network environment, the performance of a blockchain with N branches is:

$$\left( \sum_{i=0}^{N} \frac{1}{ti} K \text{ transaction/unit time (seconds)} \right);$$

in which $t_i$ represents the time interval of block generation of the $i_{th}$ branch.

It is supposed that the time for a block to be spread across the entire network blockchain device through a P2P network is TL. Then, T should be greater than TL based on the conditions under which the blockchain device can achieve consensus. Moreover, it is assumed that the time for the $i_{th}$ branch block to be spread across the entire corresponding group is $l_i$. Since the in-group transmission delay time among the blockchain devices is shorter, TL>$l_i$. Furthermore, because $t_i$ must be smaller than $l_i$, it can be obtained that the time interval of block generation of a branch can be shorter than the time interval of block generation of the entire consensus network, that is, $t_i \leq T$.

In one embodiment, based on the considerations for the security, when a blockchain device needs to use data of another branch to verify a transaction of one block in a specific branch, the blockchain device will mark the hash value of the source block of the data in the another branch in the block of the specific branch. In this way, if a malicious attacker wants to attack the data of the block in the specific branch, the malicious attacker needs to modify all the blocks in the specific branch and the data behind the source block of the another branch at the same time, whereby the difficulty of the attack is increased.

In the following, the flow of generating a blockchain branch will be described in conjunction with FIG. 3A and FIG. 3B.

FIG. 3A is a schematic diagram of the blockchain branch flow in the first stage. In the example of FIG. 3A, the blockchain system includes blockchain devices $D_1$-$D_9$ and maintains a blockchain MC'. The blockchain MC' may be a main chain of a block that has not yet been branched, or may be a blockchain branch generated due to the blockchain branching process. In other words, after the main chain of a block branches, each of the branches can be further split into multiple sub-branches to form a multi-level tree blockchain structure.

The blockchain MC' includes the blocks $BK_1'$ and $BK_2'$, in which the block $BK_1'$ and the block $BK_2'$ respectively include a classification function. In this embodiment, the classification function [d] is implemented as: <S(T) % P>, in which S( ) represents the transaction sender ID, T is the transaction value, and P is the divisor. By adjusting the value of the divisor P, the number of the branches can be determined. As shown in FIG. 3A, P is set to 2. Therefore, once the blockchain MC' branches, there will be two results: S(T) %2==1 and S(T) %2==0, i.e., two branches. However, the present disclosure is not limited thereto. The classification function may also be implemented based on the contract type, the contract content, or other transaction-related data. By executing the classification with the classification function, each type of transaction will only have one corresponding branch responsible for processing. Taking the example of FIG. 3A as an example, there will not be a transaction sender ID divided by a number that will simultaneously correspond to multiple remainder results.

In the first stage as shown in FIG. 3A, the blockchain devices $D_1$-$D_9$ continuously monitor the status information of the system. If any blockchain device finds that the status information of the system complies with the blockchain branch conditions, for example, finds that the computing power of the blockchain MC' exceeds a computing power threshold value, and the number of the transactions to be processed is excessive, the blockchain device (the device $D_5$ in this example) will write the branch instruction to the block (in this case, the block $BK_2$) to require the blockchain MC' to branch. The branch instruction may for example include a branch validation parameter to indicate that the blockchain MC' should branch after several blocks. As shown in FIG. 3A, the branch instruction in the block $BK_2'$ includes the branch validation parameter=0, which indicates that the branch is performed in the next block.

Since the blocks in the blockchain MC' will broadcast to all blockchain devices, the other devices $D_1$-$D_4$ and $D_6$-$D_9$ may verify the branch instruction in the block $BK_2'$ after the device $D_5$ writes the branch instruction to the block $BK_2'$, to confirm whether the status information of the current blockchain system does indeed comply with the blockchain branch condition. If the branch condition passes the verification, the branch flow will enter the second stage as shown in FIG. 3B. On the contrary, if the branch instruction fails to pass the verification, the blockchain MC' will not branch.

FIG. 3B is a schematic diagram of the blockchain branch flow in the second stage. Once the branch instruction passes the verification, the blockchain MC' will be split into two branches according to the classification result of the classification function: the branch $SC_A'$ corresponding to the classification result S(T) %2==1 and the branch $SC_B'$ corresponding to the classification result S(T) %2==0.

In response to the branch instruction, the blockchain devices $D_1$-$D_9$ in the blockchain system firstly determine whether the branches (in this case, the branch $SC_A'$ and the branch $SC_B'$) all have a seed device to generate a corresponding root block. The seed device refers to a blockchain device that obtains the allowance for writing the branched root block.

If the determination is yes, that is, the root blocks (the block $BK_{A1}'$ and the block $BK_{B1}'$ in this example) of all the branches $SC_A'$ and $SC_B'$ have been calculated by the seed device, then the blockchain devices other than the seed device will preferentially choose to join a group to which another blockchain device (i.e., a second blockchain device) belongs, in which these devices have the lowest network transmission delay time with respect to the another blockchain device. However, if the number of blockchain devices of a group to which the blockchain device is intended to join has reached an upper limit, the blockchain device will instead choose to join a group to which the other blockchain device (i.e., a third blockchain device) belongs, in which this blockchain device has the second lowest network transmission delay time with respect to the other block device, and so on.

If the determination is no, that is, there is still the root block of the branch that has not been calculated by the seed device, then the blockchain device other than the seed device will become the seed device of a specific branch of the branches that have not yet generated the root block by a competition or a predetermined rule (e.g., random selection or pre-assignment).

As shown in FIG. 3B, the blockchain device $D_1$ is accepted as a seed device (presented by a slash net circle) of the branch $SC_A'$ because it obtains the allowance for writing the root block $BK_{A1}'$. The blockchain device $D_7$ is accepted as a seed device (presented by a slash net circle) of the branch $SC_B'$ because it obtains the allowance for writing the root block $BK_{B1}'$. For other blockchain devices $D_2$-$D_6$, $D_8$-$D_9$ of non-seed devices, these blockchain devices will choose the same group to which the blockchain devices that have the shortest transmission delay time with respect to themselves to join. Taking the blockchain device $D_4$ as an example, the blockchain device $D_4$ can store a correspondence table as follows (Table 1):

TABLE 1

| blockchain device | transmission delay time (s) | belonging group |
|---|---|---|
| $D_1$ | 2 | $DG_A'$ |
| $D_2$ | 1.5 | $DG_A'$ |
| $D_3$ | 1 | $DG_A'$ |
| $D_5$ | 5 | $DG_B'$ |
| $D_6$ | 4.5 | $DG_B'$ |
| $D_7$ | 5.5 | $DG_B'$ |
| $D_8$ | 6 | $DG_B'$ |
| $D_9$ | 6 | $DG_B'$ |

As shown in Table 1, after the blockchain devices $D_1$-$D_7$ become the seed devices of $SC_A'$ and $SC_B'$, respectively, the blockchain device $D_4$ can select the blockchain device $D_3$ having the shortest transmission delay time with respect to itself to join the same group $DG_A'$ according to the contents of the correspondence table to verify the branch $SC_A'$. Similarly, other blockchain devices may also choose to join the group $DG_A'$ or $DG_B'$ in the same manner. Although the above table is used as an example to illustrate the data that may be included in the correspondence table, the present disclosure is not limited thereto. The number of the blockchain devices, the value of the transmission delay time, and the group to which it belongs in the correspondence table, and the manner in which the information is presented may be adjusted according to the actual application.

In one embodiment, if the number of the blockchain devices of the group to which a blockchain device intends to join has reached an upper limit, the blockchain device will instead join the group whose network transmission delay time is the second lowest with respect to itself. For example, if the number of the devices that the blockchain device $D_4$ intends to join into the group $DG_A'$ has reached an upper limit (for example, 3 devices), the blockchain device $D_4$ will instead join the group whose network transmission delay time is the second lowest with respect to itself, e.g., the group $DG_B'$.

If the blockchain device $D_4$ successfully joins the group $DG_A'$, the blockchain devices $D_1$-$D_4$ will adjust the time interval of block generation of the branch $SC_A'$ according to the in-group maximum transmission delay time of the group $DG_A'$ to be smaller than he time interval of block generation of the entire network. Similarly, the blockchain devices $D_5$-$D_9$ also adjust the time interval of block generation of the branch $SC_B'$ according to the in-group maximum transmission delay time of the belonged group $DG_B'$ to be smaller than the time interval of block generation of the entire network. Then, the blockchain devices in the group $DG_A'$ and the group $DG_B'$ will generate the blocks of the branch $SC_A'$ and the branch $SC_B'$ according to the adjusted time interval of block generation, respectively.

Figure 4:
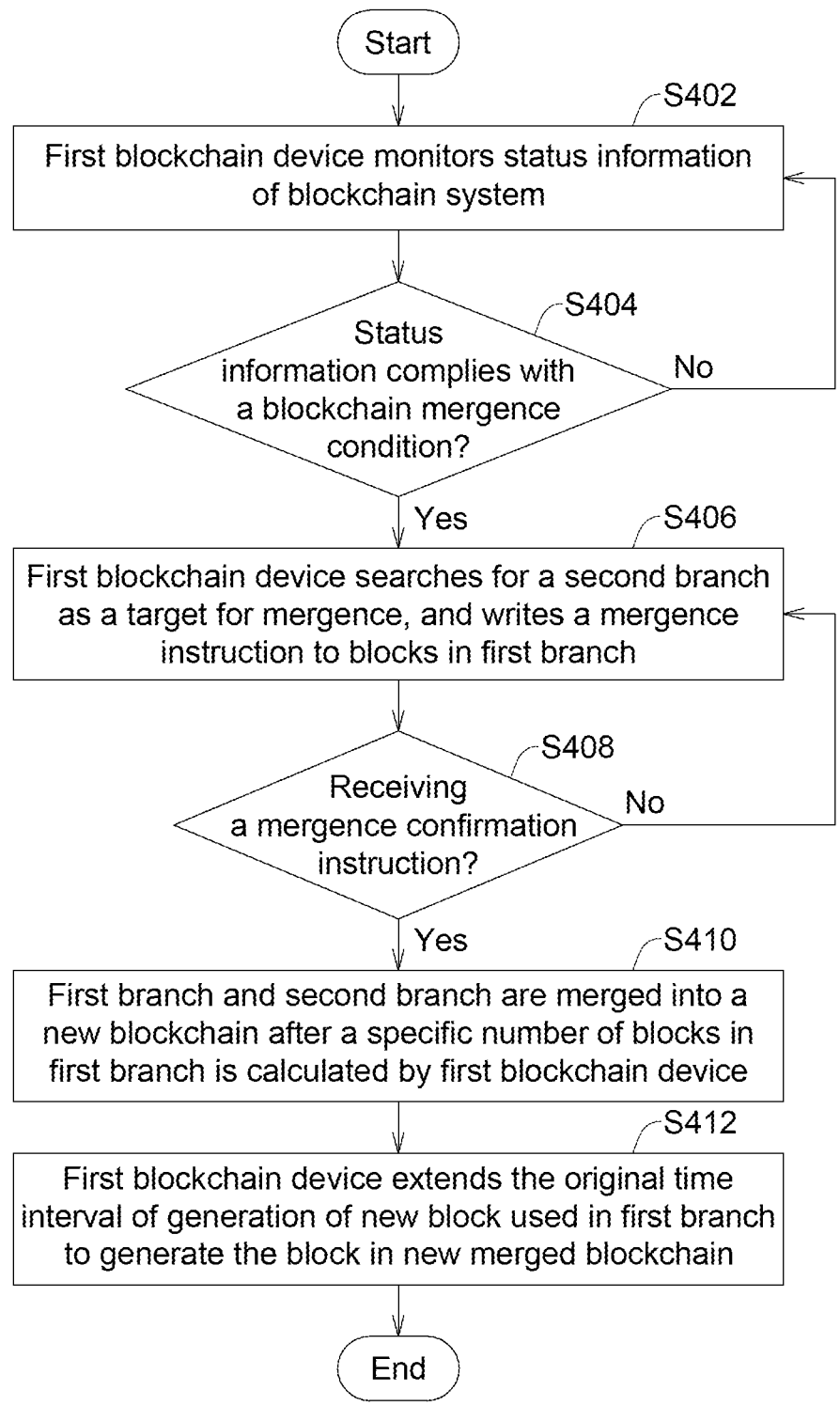
FIG. 4 is a flow chart of a method for the condition of the emergence of the blockchain according to an embodiment of the present disclosure.

FIG. 4 is a flowchart of a method according to one embodiment of the present disclosure. This flow is directed to the case of blockchain mergence. For example, after a block chain is performed as shown in FIG. 2, then the mergence is performed for some or all branches.

In step S402, the first blockchain device in the network monitors a status information of the blockchain system. The status information refers to, for example, the computing power of the main chain or branch of the block, the number of blockchain devices in the main chain or branch of the block, and the like.

In step S404, the first blockchain device determines whether the status information in the network complies with a blockchain mergence condition. In one embodiment, the blockchain mergence condition includes at least one of the following condition (1) and condition (2), wherein the condition (1) is: a computing power of verifying the blockchain or one of the branches is less than a second computing power threshold value; the condition (2) is: the number of the blockchain devices for verifying the blockchain or one of the branches is less than a second device number threshold value. The second computing power threshold value and the second device number threshold value mentioned herein may be arbitrary depending on the system requirements or the consensus algorithm adopted.

If the determination in step S404 is yes, in step S406, the first blockchain device searches for a second branch as a merged target, and writes a mergence instruction to the block in the first branch. The mergence instruction includes, for example, a mergence condition and a mergence-effective parameter, in which the mergence condition can be achieved through a combination of the classification function values corresponding to the branches before the merging, and the mergence-effective parameter is used to indicate that merging the branches is performed after several blocks.

If the determination in step S404 is no, it represents that there is no need to merge branches, and the flow returns to step S402, and the first blockchain device continues to monitor the status information of the blockchain system.

In step S408, the first blockchain device determines whether it receives a mergence confirmation instruction from the second group for verifying the second branch. In other words, after the second group responsible for verifying the second branch receives the mergence instruction, it will check whether the mergence instruction complies with the blockchain mergence condition and determine whether the merged blockchain complies with other security settings, for example, whether the number of the blockchain devices has reached an upper limit. After the verification of the mergence instruction passes, the second group will distribute the merger confirmation instruction. On the other hand, after the second group agrees to merge, it will also calculate how many blocks behind then performing the emergence.

If the determination in step S408 is yes, in step S410, the first blockchain device will calculate a specific number of the blocks later the first branch and the second branch are merged into a new blockchain a. The new blockchain is verified by a merged group including the first group and the second group.

In step S412, the first blockchain device extends a new time interval of block generation originally used for the first branch to generate the block in the merged new blockchain.

For example, before the branches merge, the blockchain device in the first group may gradually increase the time interval of block generation (e.g., $T_1$ seconds) of the first branch so that the time interval of block generation of the first branch reaches the predetermined time interval of block generation (e.g., Tx seconds, in which $Tx>T_1$) after passing through L blocks, to generate the blocks of the merged new block chain; or, the blockchain devices in the first group may directly increases the time interval of block generation of the first branch to reach the predetermined time interval of block generation after the first branch passes through the L blocks, and generate the block in the merged new block chain according to the predetermined time interval of block generation. On the other hand, the blockchain device in the second group may gradually increase the time interval of block generation (e.g., $T_2$ seconds) of the second branch so that the time interval of block generation of the second branch reaches the predetermined time interval of block generation (e.g., Tx seconds, in which $Tx>T_2$) after passing through K blocks, to generate the blocks of the merged new block chain; or, the blockchain devices in the second group may directly increases the time interval of block generation of the second branch to reach the predetermined time interval of block generation after the second branch passes through the K blocks, and generate the block in the merged new block chain according to the predetermined time interval of block generation.

If the determination in step S408 is no, it represents that the blockchain device in the second group does not agree to merge the first branch and the second branch, and the flow returns to step S406, and the first group will search for a new merged target.

Figure 5:
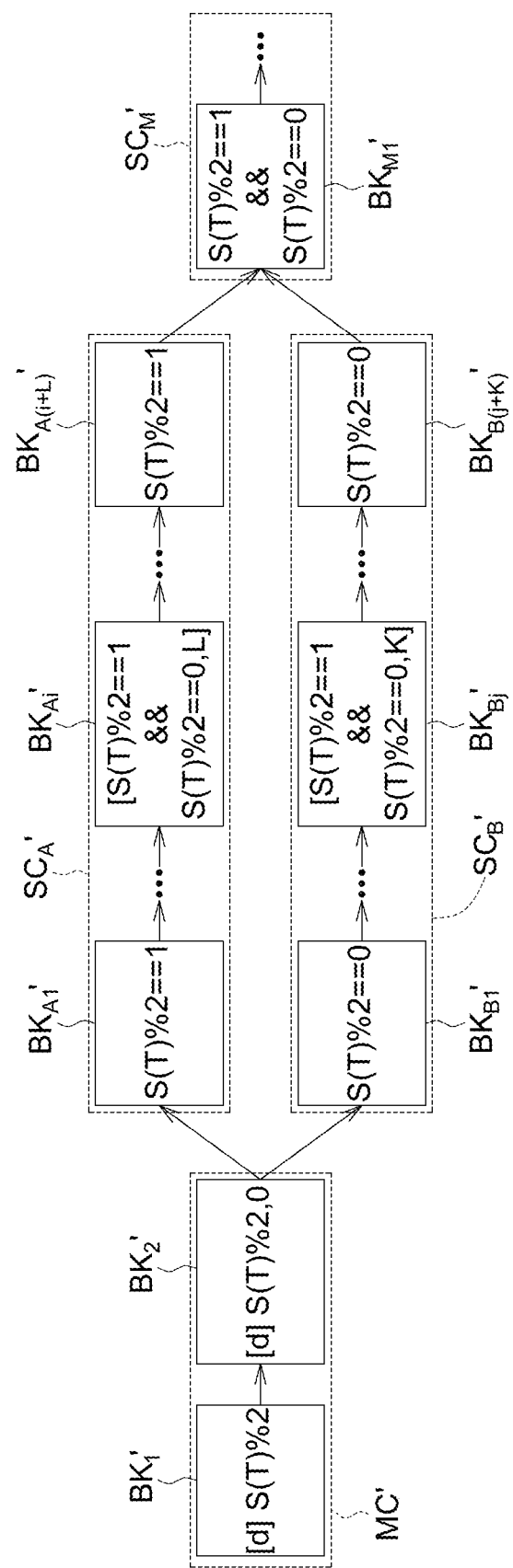
FIG. 5 is a schematic diagram of merging a blockchain.

FIG. 5 is a schematic diagram of merging the blockchain. For ease of understanding, FIG. 5 continues the example of FIG. 3B. According to the example of FIG. 5, after forming the branches $SC_A'$ and $SC_B'$ for a period of time, the blockchain device in the group $DG_B'$ finds that the status information of the blockchain system complies with the blockchain mergence condition, for example, finds that the computing power of verifying the branch $SC_B'$ is lower than a computing power threshold value, so it decides to be merged with the branch $SC_A'$. The blockchain device of the group $DG_B'$ will write a mergence instruction to a block (such as the block $BK_{Bj}'$) of the branch $SC_B'$. The mergence instruction [M] may be implemented, for example, as follows: <classification function value 1 && classification function value 2, $VP_M$>, in which the classification function value # represents the classification function value corresponding to the branch to be merged, and $VP_M$ is a mergence effective parameter used to indicate that the branches are merged after a certain number of blocks. As shown in FIG. 5, the block $BK_{Bj}'$ is written with the mergence instruction [M]: [S(T) %2==1 && S(T) %2==0, K], indicating that after passing through K blocks, the branch $SC_B'$ corresponding to the classification function value S(T) %2==0 will merge with the branch $SC_A'$ corresponding to the classification function value S(T) %2==1.

The mergence instruction will also be provided to another group $DG_A'$. After the blockchain device in the group $DG_A'$ confirms the merging instruction, it will calculate after several blocks then the mergence is performed, and write the corresponding mergence instruction [M]: [S(T) %2==1 && S(T) %2==0, L] to the block (e.g., the block $BK_{Ai}'$) in the branch $SC_A'$, to indicate that the mergence with the branch $SC_B'$ is performed after L blocks.

After the branches are merged, the group $DG_A'$ and the group $DG_B'$ will be merged into the same group to jointly verify and maintain the merged new blockchain $SC_M'$. Each of the blockchain devices in the group $DG_A'$ and the group $DG_B'$ will adjust the time interval of block generation of the branch previous to the mergence to the predetermined time interval of block generation, to generate the blocks in the new block chain $SC_M'$, for example, the block $BK_{M1}'$. Since the new blockchain $SC_M'$ is to merge the branch $SC_A'$ and the branch $SC_B'$, the block (e.g. $BK_{M1}'$) in the new blockchain $SC_M'$ will contain both the hashes of the branch $SC_A'$ and the branch $SC_B'$.

Although the present disclosure has been described in considerable detail with reference to certain embodiments thereof, other embodiments are possible. Therefore, the scope of the appended claims should not be limited to the description of the embodiments contained herein.

What is claimed is:

1. A method implemented in a blockchain system, the blockchain system comprising a plurality of blockchain devices that participate in a verification of a blockchain to generate a plurality of blocks in the blockchain, wherein the method comprises:
    monitoring a status information of the blockchain system by a first blockchain device of the blockchain devices;
    determining whether the status information complies with a blockchain branch condition by the first blockchain device;
    when the first blockchain device determines that the status information complies with the blockchain branch condition, the first blockchain device writes a branch instruction to a selected block in the blockchain, wherein the branch instruction is configured for enabling the blockchain to form a plurality of branches, and the blockchain devices are divided into a plurality of groups in response to the branch instruction for verifying the branches in parallel, wherein the first blockchain device joins a first group of the groups, and the first group is responsible for verifying a first branch of the branches; and
    obtaining an in-group maximum transmission delay time of the first group by the first blockchain device, and determining a time interval of generation of new block to generate a plurality of blocks in the first branch according to the in-group maximum transmission delay time;
    wherein the first blockchain device comprises a processor;
    wherein the blockchain branch condition comprises at least one of a condition (1) and a condition (2), wherein the condition (1) is: a computing power of verifying the blockchain or one of the branches is greater than a first computing power threshold value, and an amount of transactions to be processed is great than a first transaction amount threshold value; and
    the condition (2) is: a number of the blockchain devices for verifying the blockchain or one of the branches is greater than a first device number threshold value, and the amount of transactions to be processed is great than a second transaction amount threshold value.

2. The method of claim 1, wherein the blocks in the blockchain comprise a classification function, respectively, and a classification condition is substituted into the classification function to obtain a plurality of classification function values corresponding to the branches, respectively.

3. The method of claim 2, wherein the classification condition is a transaction sender ID, a smart contract type, a smart contract content, or a transaction attribute parameter.

4. The method of claim 3, wherein the classification condition is the transaction sender ID, and the classification function is to calculate a remainder of the transaction sender ID divided by a value.

5. The method of claim 1, further comprising:
    measuring a plurality of transmission delay times between the first blockchain device and other blockchain devices in the blockchain system by the first blockchain device; and
    storing a correspondence table by the first blockchain device, wherein the correspondence table records the transmission delay times and group/groups to which the other blockchain devices in the blockchain system belong.

6. The method of claim 1, further comprising:
    after writing the branch instruction, determining whether the branches all have a seed device to generate a corresponding root block by the first blockchain device;
    if the determination is yes and the first blockchain device is not the seed device, the first blockchain device preferentially chooses to join a group to which a second blockchain device belongs, wherein the first blockchain device has the lowest transmission delay time with respect to the second blockchain device; and
    if the determination is no and the first blockchain device is not the seed device, the first blockchain device becomes the seed device of a specific branch that does not yet generate the corresponding root block in the branches by a competition or a predetermined rule.

7. The method of claim 6, further comprising:
    when a number of the blockchain devices in the group to which the second blockchain device belongs reaches an upper limit, the first blockchain device instead chooses to join a group which a third blockchain device belongs, wherein the first blockchain device has the second lowest transmission delay time with respect to the third blockchain device.

8. The method of claim 1, further comprising:
    determining whether the status information complies with a blockchain mergence condition;
    when the first blockchain device determines that the status information complies with the blockchain mergence condition, the first blockchain device searches for a second branch and writes a mergence instruction to the block in the first branch, wherein the second branch is verified by a second group of the groups;
    responding to a mergence confirmation instruction from the second group, wherein the first blockchain device controls the first branch and the second branch to be merged into a new blockchain after a specific number of the block in the first branch is calculated, the new blockchain is verified by a merged group, the merged group comprises the first group and the second group; and the first blockchain device extends the time interval of generation of new block to generate the block in the new blockchain.

9. The method of claim 8, wherein the blockchain mergence condition comprises at least one of a condition (1) and a condition (2), wherein the condition (1) is: a computing power of verifying the blockchain or one of the branches is less than a second computing power threshold value; and the condition (2) is: a number of the blockchain devices for verifying the blockchain or one of the branches is less than a second device number threshold value.

10. A blockchain system, comprising:

a plurality of blockchain devices participating in a verification of a blockchain to generate a plurality of blocks in the blockchain, wherein the blockchain devices comprises a first blockchain device, the first blockchain device is configured for executing the following steps:

monitoring a status information of the blockchain system;

determining whether the status information complies with a blockchain branch condition;

when the status information complies with the blockchain branch condition, writing a branch instruction to a selected block in the blockchain, wherein the branch instruction is configured for enabling the blockchain to form a plurality of branches, and the blockchain devices are divided into a plurality of groups in response to the branch instruction for verifying the branches in parallel, wherein the first blockchain device joins a first group of the groups, and the first group is responsible for verifying a first branch of the branches; and obtaining an in-group maximum transmission delay time of the first group, and determining a time interval of generation of new block to generate a plurality of blocks in the first branch according to the in-group maximum transmission delay time;

wherein the first blockchain device comprises a processor;

wherein the blockchain branch condition comprises at least one of a condition (1) and a condition (2), wherein the condition (1) is: a computing power of verifying the blockchain or one of the branches is greater than a first computing power threshold value, and an amount of transactions to be processed is great than a first transaction amount threshold value; and the condition (2) is: a number of the blockchain devices for verifying the blockchain or one of the branches is greater than a first device number threshold value, and the amount of transactions to be processed is great than a second transaction amount threshold value.

11. The blockchain system of claim 10, wherein the blocks in the blockchain comprise a classification function, respectively, and a classification condition is substituted into the classification function to obtain a plurality of classification function values corresponding to the branches, respectively.

12. The blockchain system of claim 11, wherein the classification condition is a transaction sender ID, a smart contract type, a smart contract content, or a transaction attribute parameter.

13. The blockchain system of claim 12, wherein the classification condition is the transaction sender ID, and a classification function value is a remainder of the transaction sender ID divided by a value.

14. The blockchain system of claim 10, wherein the first blockchain device is further configured for:

measuring a plurality of transmission delay times between the first blockchain device and other blockchain devices in the blockchain system; and storing a correspondence table, wherein the correspondence table records the transmission delay times and group/groups to which the other blockchain devices in the blockchain system belong.

15. The blockchain system of claim 10, wherein the first blockchain device is further configured for:

after writing the branch instruction, determining whether the branches all have a seed device to generate a corresponding root block;

if the determination is yes and the first blockchain device is not the seed device, the first blockchain device preferentially chooses to join a group to which a second blockchain device belongs, wherein the first blockchain device has the lowest transmission delay time with respect to the second blockchain device; and if the determination is no and the first blockchain device is not the seed device, the first blockchain device becomes the seed device of a specific branch that does not yet generate the corresponding root block in the branches by a competition or a predetermined rule.

16. The blockchain system of claim 15, wherein the first blockchain device is further configured for:

when a number of the blockchain devices in the group to which the second blockchain device belongs reaches an upper limit, instead choosing to join a group which a third blockchain device belongs, wherein the first blockchain device has the second lowest transmission delay time with respect to the third blockchain device.

17. The blockchain system of claim 10, wherein the first blockchain device is further configured for:

determining whether the status information complies with a blockchain mergence condition;

when the status information complies with the blockchain mergence condition, searching for a second branch and writes a mergence instruction to the block in the first branch, wherein the second branch is verified by a second group of the groups;

responding to a mergence confirmation instruction from the second group, controlling the first branch and the second branch to be merged into a new blockchain after a specific number of the block in the first branch is calculated, the new blockchain is verified by a merged group, the merged group comprises the first group and the second group; and extending the time interval of generation of new block to generate the block in the new blockchain.

18. The blockchain system of claim 17, wherein the blockchain mergence condition comprises at least one of a condition (1) and a condition (2), wherein the condition (1) is: a computing power of verifying the blockchain or one of the branches is less than a second computing power threshold value;

the condition (2) is: a number of the blockchain devices for verifying the blockchain or one of the branches is less than a second device number threshold value.

* * * * *